United States Patent [19]
Enomoto

[11] Patent Number: 5,701,992
[45] Date of Patent: Dec. 30, 1997

[54] SORTING EQUIPMENT

[75] Inventor: Masahiro Enomoto, Komaki, Japan

[73] Assignee: Daifuku Co., Ltd., Osaka, Japan

[21] Appl. No.: 657,755

[22] Filed: May 31, 1996

[30] Foreign Application Priority Data

Jun. 2, 1995 [JP] Japan ................ 7-135530
Jun. 2, 1995 [JP] Japan ................ 7-135531

[51] Int. Cl.$^6$ ................................................ B65G 37/00
[52] U.S. Cl. ............................ 198/370.06; 198/370.1
[58] Field of Search .................... 198/370.01, 370.03, 198/370.06, 370.1

[56] References Cited

U.S. PATENT DOCUMENTS

| | | | |
|---|---|---|---|
| 4,096,936 | 6/1978 | Nielsen | 198/370.06 |
| 4,884,676 | 12/1989 | Suizu | 198/370.06 |
| 4,930,613 | 6/1990 | Okura et al. | 198/370.06 |

FOREIGN PATENT DOCUMENTS 2182613   7/1990   Japan.
5207603   8/1993   Japan.

*Primary Examiner*—James R. Bidwell
*Attorney, Agent, or Firm*—Barnes, Kisselle, Raisch, Choate, Whittemore & Hulbert, P.C.

[57] ABSTRACT

A sorting equipment comprising a plurality of running trucks which travel in a coupled condition with one another along a definite travelling route comprised of a pair of rails. Disposed in each of the running trucks is a conveyor for conveying load laterally relative to a running direction. Induction lines are laid for supplying a high-frequency current along the travelling rails and a pickup coil is disposed in the running truck in an opposed relation to the induction lines. Rollers provided to each running truck which are to be brought into contact with the travelling rails are comprised of electrically conductive wheels, and the travelling rails are made of an electrically conductive material. In each running truck, a linear motor is disposed above the travelling rails and a metal plate is disposed on the linear motor. The metal plate is connected to an earthling conductor wired in the running truck, and the earthling conductor is connected to the rollers.

5 Claims, 9 Drawing Sheets

SORTING EQUIPMENT

FIELD OF THE INVENTION

The present invention relates to a sorting equipment comprising a plurality of running trucks which travel along a definite route in a condition where they are coupled with one another and mounting load thereon, and discharge the load at sorting locations preset along the definite route.

BACKGROUND OF THE INVENTION

Known as a conventional sorting equipment is an equipment disclosed in Japanese Patent Application Laid-Open No. 2-182613 comprising a plurality of running trucks which travel along the running rails in the condition coupled with one another wherein each of the running trucks is equipped with a conveyor which is capable of carrying load laterally relative to a travelling direction of the running truck, driven for discharging the load in the lateral direction when the running truck passes by a plurality of sorting locations formed as openings in the lateral direction along the definite route.

A movable body of the running truck which travels with the conveyor mounted on a top surface thereof is composed of a body frame, horizontal axis travelling rollers composed of wheels made of urethane which travel on travelling rails having an I-shaped sectional shape while supporting the body frame, vertical axis side rollers composed of urethane-made wheels which support the travelling rails from the right and left sides, and driving rollers disposed on side surfaces of the body frame. The movable body is moved while being pushed by the driving rollers which rotate along grooves formed in screws turning in the travelling direction. Further, disposed along the travelling rails is a power supply rail which supplies electric power through a current collector to a motor for driving the conveyor.

The conventional sorting equipment poses a problem that it has a short service life or requires a high maintenance cost since it allows remarkable abrasion of the current collector and the power supply rail, and another problem that it allows noise to be produced by the current collector which is brought into frictional contact with the power supply rail.

For solving these problems, it is conceivable to adopt a contactless power supply system for a sorting equipment as proposed by Japanese Patent Application Laid-Open No. 5-207603.

Speaking concretely, an induction line is disposed along the travelling rails in place of the power supply rail and a pickup coil is used in the running truck in place of the current collector for generating an electromotive force by utilizing a magnetic flux produced by the induction line for supplying electric power to the motor for driving the conveyor.

When such a known contactless power supply system is adopted, however, electric charges are produced due to the magnetic flux produced by the induction line and accumulated on the urethane-made wheels (the horizontal axis travelling rollers and vertical axis side rollers) of the running trucks whereby the wheels produce static electricity of 7,000 V at maximum. When the travelling trucks are driven with linear motors, i.e., when linear motors are disposed along the travelling rails in place of the screws and secondary conductors for the linear motors are disposed on the travelling trucks in place of the driving rollers, sparks are emitted from eddy currents produced in the secondary conductors for the linear motors due to the magnetic flux produced from the induction line. As a result, workers may be subjected to electrical shock hazards and a problem may be posed that the sorting operations are disabled due to destruction of data in controllers for the conveyors on the running trucks.

DISCLOSURE OF THE INVENTION

For solving the problems described above, it is a primary object of the present invention to provide a sorting equipment which is capable of avoiding workers' electrical shock hazards and destruction of data in controllers by preventing static electricity and electric discharge from being produced due to a magnetic flux produced from an induction line.

For accomplishing this object, the present invention provides a sorting equipment comprising a plurality of running trucks which travel along a definite travelling route in a condition where they are coupled with one another and characterized in that each of the running trucks is configured as a sorting equipment having at least one carrying means for carrying load laterally relative to a travelling direction of the running truck, that disposed along definite travelling route are induction type power supply lines to which a high-frequency current is supplied, that an electromotive force is produced in the running truck due to a magnetic flux produced by the induction type power supply lines, that a power supply coil is disposed for supplying power to the carrying means, that the definite travelling route is made of an electrically conductive material and that the running truck has at least one wheel which is electrically conductive.

The sorting equipment which is configured as described above is capable of supplying power to the running trucks in a contactless condition since the magnetic flux of the induction line produces electromotive force in the power supply coils disposed in the running trucks travelling along the definite travelling route along which the induction lines are disposed and preventing static electricity to be generated since electric charges produced in wheels of the running trucks due to the magnetic flux of the induction line is discharged through the conductive wheels to the definite travelling line. Accordingly, the sorting equipment is capable of preventing workers from being subjected to electrical shock hazards, avoiding destruction of data in the controllers and preventing the sorting operations from being disabled.

DESCRIPTION OF THE EMBODIMENTS

Now, the preferred embodiments of the sorting equipment of the present invention will be described in detail below with reference to the accompanying drawings.

Figure 4:
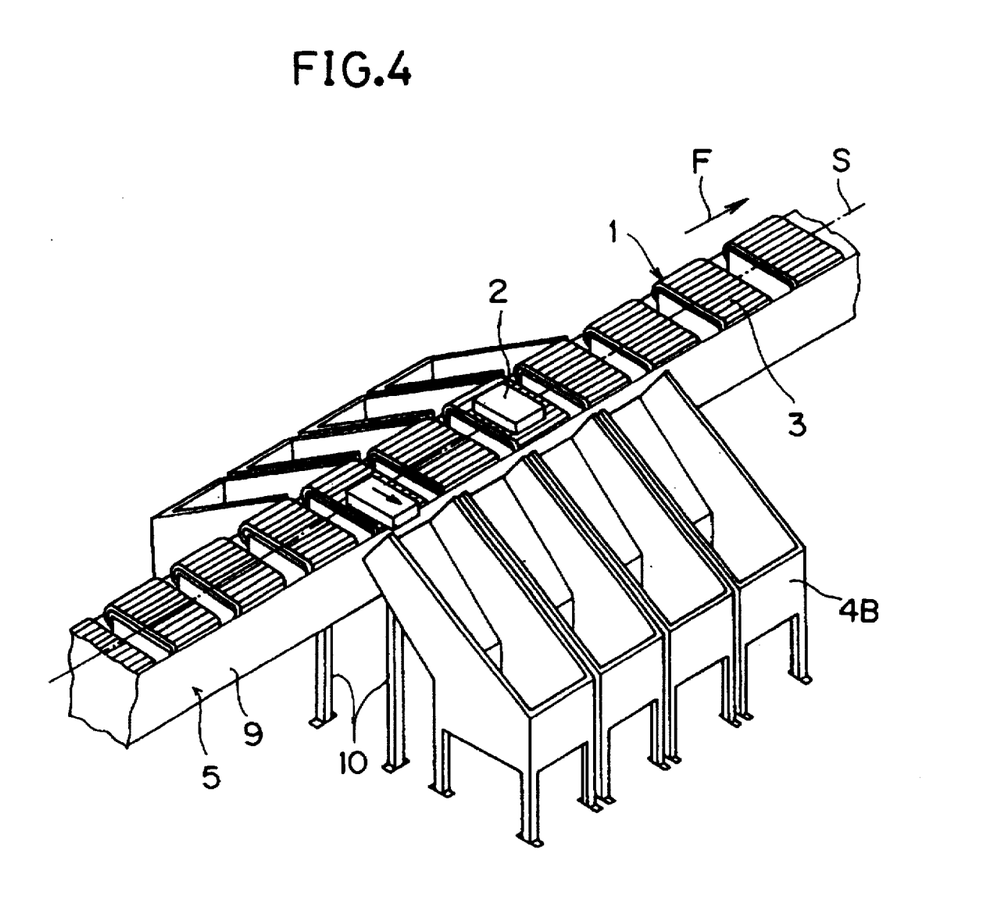
FIG. 4 is a perspective view partially illustrating the first embodiment of the sorting equipment.
Figure 5:
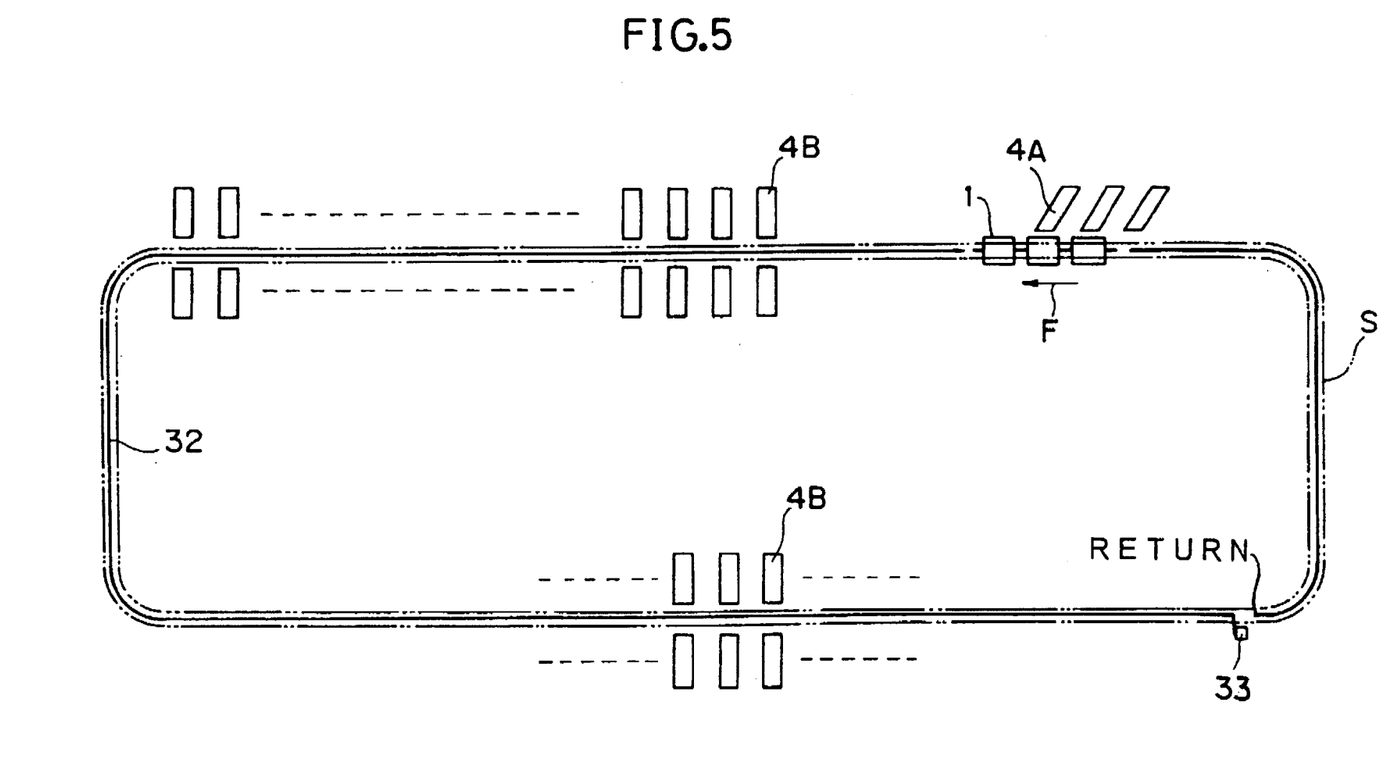
FIG. 5 is a diagram illustrating an overall configuration of the first embodiment of the sorting equipment.

In FIGS. 4 and 5, a reference numeral 1 represents a running truck which travels in a direction indicated by an arrow F along a definite travelling route S in a condition where it is coupled with other running trucks. Disposed on this running truck is a sorting conveyor 3 which carries load (articles to be carried) 2 laterally relative to the direction F. Further, disposed along the travelling route S are a plurality of loading ports 4A which are open in the lateral direction perpendicular to the direction F and a plurality of sorting chute 4B which are open in the lateral direction perpendicular to the direction F so that the load 2 can be loaded from the loading ports 4A and discharged into the sorting chute 4B by driving the sorting conveyor 3.

Structures of the running truck 1 and a travelling rail assembly 5 composing the travelling route S will be described with reference to FIGS. 1 through 3.

The travelling rail assembly 5 is composed of a base 6 disposed along the travelling route S, supports 7 which are disposed on the base 6 at definite intervals in the direction F, a travelling rail which is vertically supported by the supports 7 and cover members 9 which are erected along the base 6 at both end thereof. The travelling rail assembly 5 is mounted on leg members 10 which are disposed at predetermined intervals in the direction F as shown in FIG. 4. The travelling rail is made of an electrically conductive material such as an aluminum alloy. Further, disposed on one side of the travelling rail 8 is a linear motor (stator).

The sorting conveyor 3 is composed of a driving roller 15A and a follower roller 15B which are opposed to each other, an endless member (for example, a belt) 16 which is stretched between the rollers 15A and 15B, and a motor 18 which is coupled with the driving roller 15A by way of an endless rotating member (for example, a belt) 17. The motor 18 is capable of driving in a normal direction and a reverse direction, and is disposed in a body frame 22 to be described later. The motor 18 is adopted as a means for driving the sorting conveyor 3. The sorting conveyor 3 rotates the endless member 16 and carries the load 2 by rotating the driving roller 15A with the motor 18. Further, the sorting conveyor 3 is disposed on a movable body 20.

The movable body 20 is composed of a body frame 22 for supporting the sorting conveyor 3, horizontal axis travelling rollers 23 which support the body frame 22 and travel on the travelling rail 8, a vertical axis side rollers 24 which support the travelling rail 8 from the right and left sides for preventing it from rolling, and a metal plate 25 disposed on an inside surface of the body frame so as to be opposed to the linear motor 11 and form a secondary conductor for the linear motor. The movable body 20 is moved while being pushed by the metal plate 25 to which thrust is given by the linear motor 11. Further, the horizontal axis travelling rollers 23 and the vertical axis side rollers 24 are made of electrically conductive wheels made of a material such as electrically conductive urethane. The running truck 1 is coupled with other running trucks by using coupling mechanisms 26 disposed on front and rear ends of the body frame 22 so that all the running trucks 1 are driven by the linear motor 11 and travel at a definite speed on the travelling rail 8.

Figure 3:
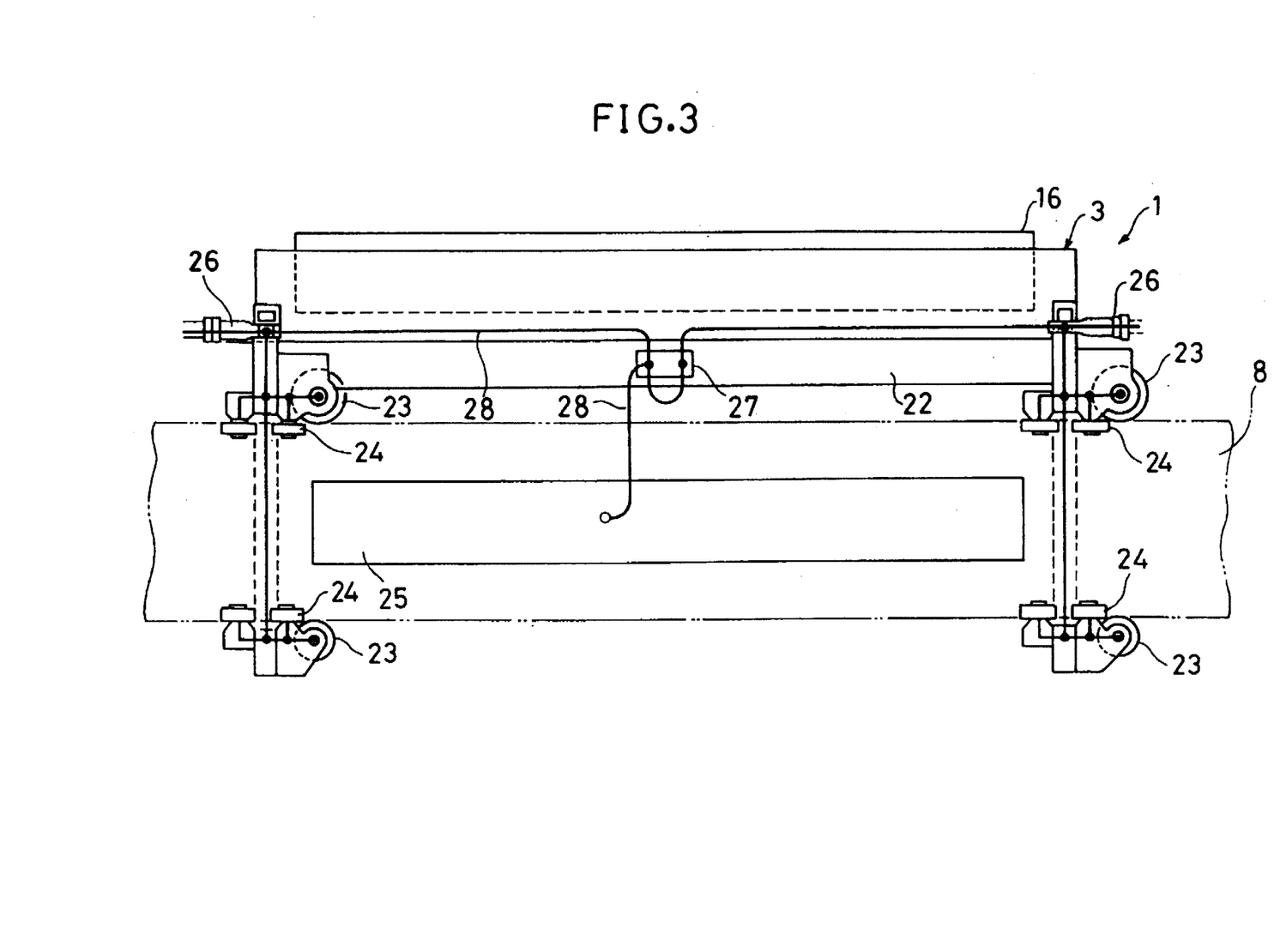
FIG. 3 is diagram illustrating a ground circuit of the running truck disposed in the first embodiment of the sorting equipment.

A ground terminal block 27 having two terminals is disposed on the body frame 22 of the movable body 20 as shown in FIG. 3. The two terminals on the ground terminal block are connected to each other, and each of the terminals on the ground terminal block 27 is connected to ground terminal blocks 27 on preceding and following running trucks 1 through an earthling conductor 28 which is disposed along the coupling mechanisms 26. As a result, the earthling conductor 28 is connected through all the running trucks 1. Further, the ground terminal block 27 is connected to the metal plate 25 of the linear motor through the earthling conductor 28, and electrically connected to the horizontal axis travelling rollers 23 and the vertical axis side rollers 24 composed of the electrically conductive urethane wheels through bearings of the rollers.

Further, disposed on the other side surface of the travelling rail 8 are hangers 31 at predetermined intervals in the lateral direction and stretched on these hangers 31 are a pair of upper and lower induction lines 32. These induction lines 32 have loop-like forms which have connected terminal ends and starting ends connected to a power supply 33 for supplying a high-frequency sinusoidal wave current from the power supply 33. The induction lines 32 are composed of stranded wires (hereinafter referred to as litz wires) which are composed of thin insulated strands and covered with an insulating material, for example, a resin material.

Figure 1:
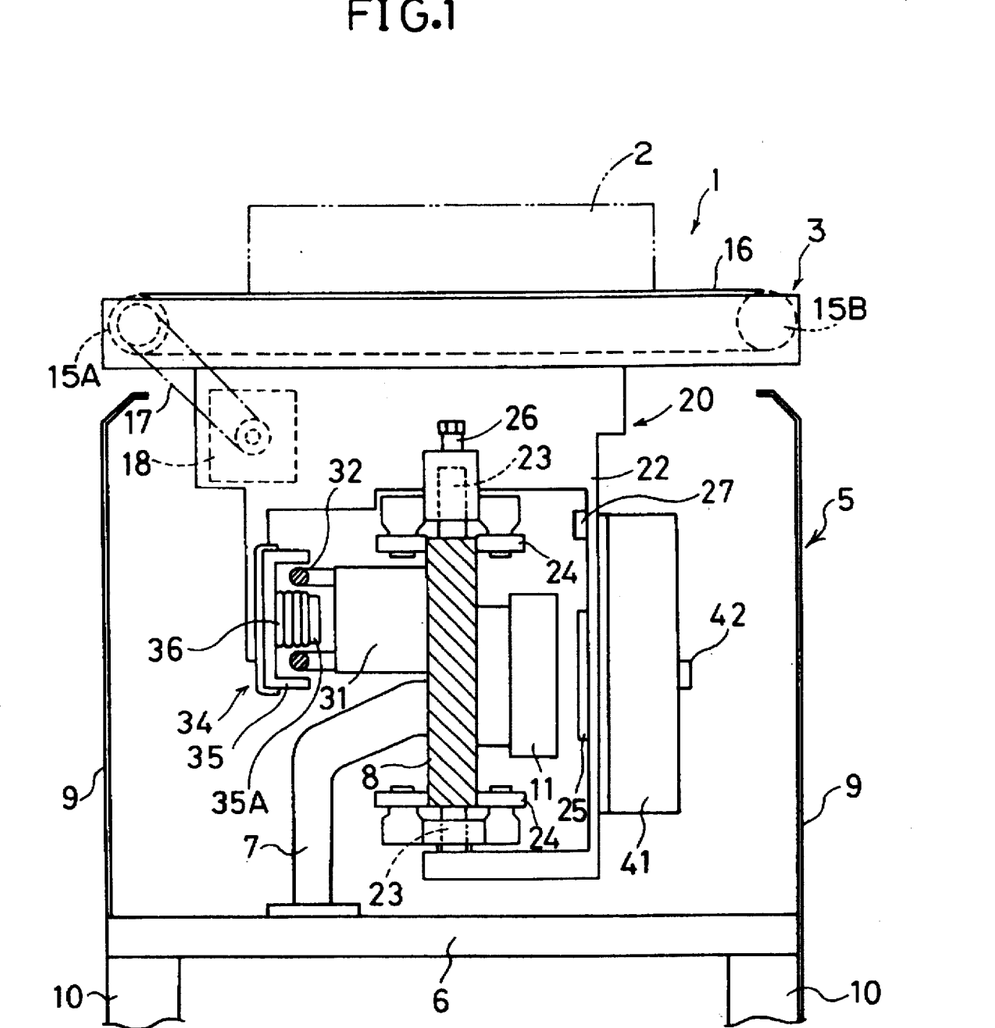
FIG. 1 is a front view illustrating a running truck of a first embodiment of the sorting equipment according to the present invention.
Figure 2:
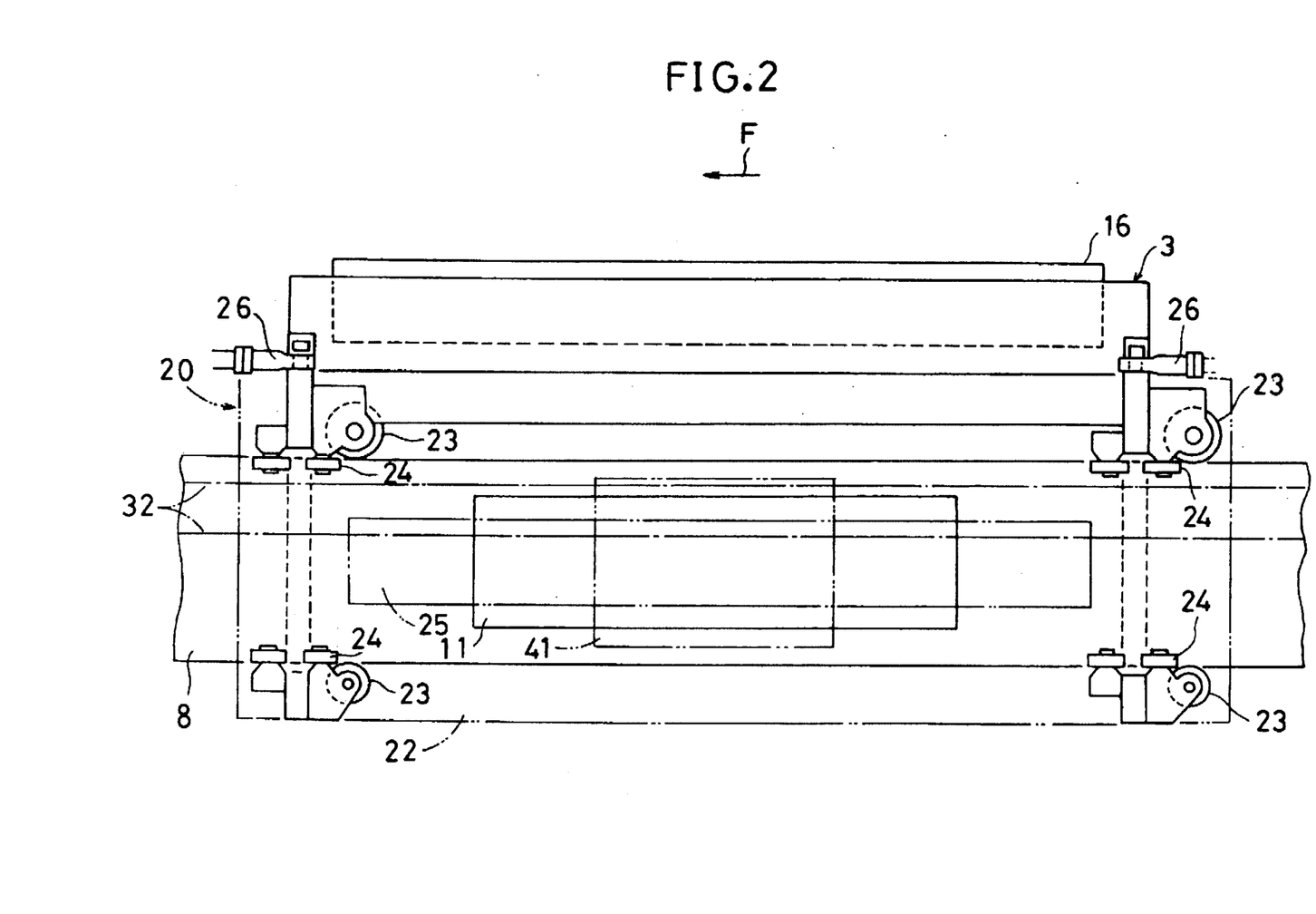
FIG. 2 is a side view illustrating the running truck of the first embodiment of the sorting equipment.
Figure 6:
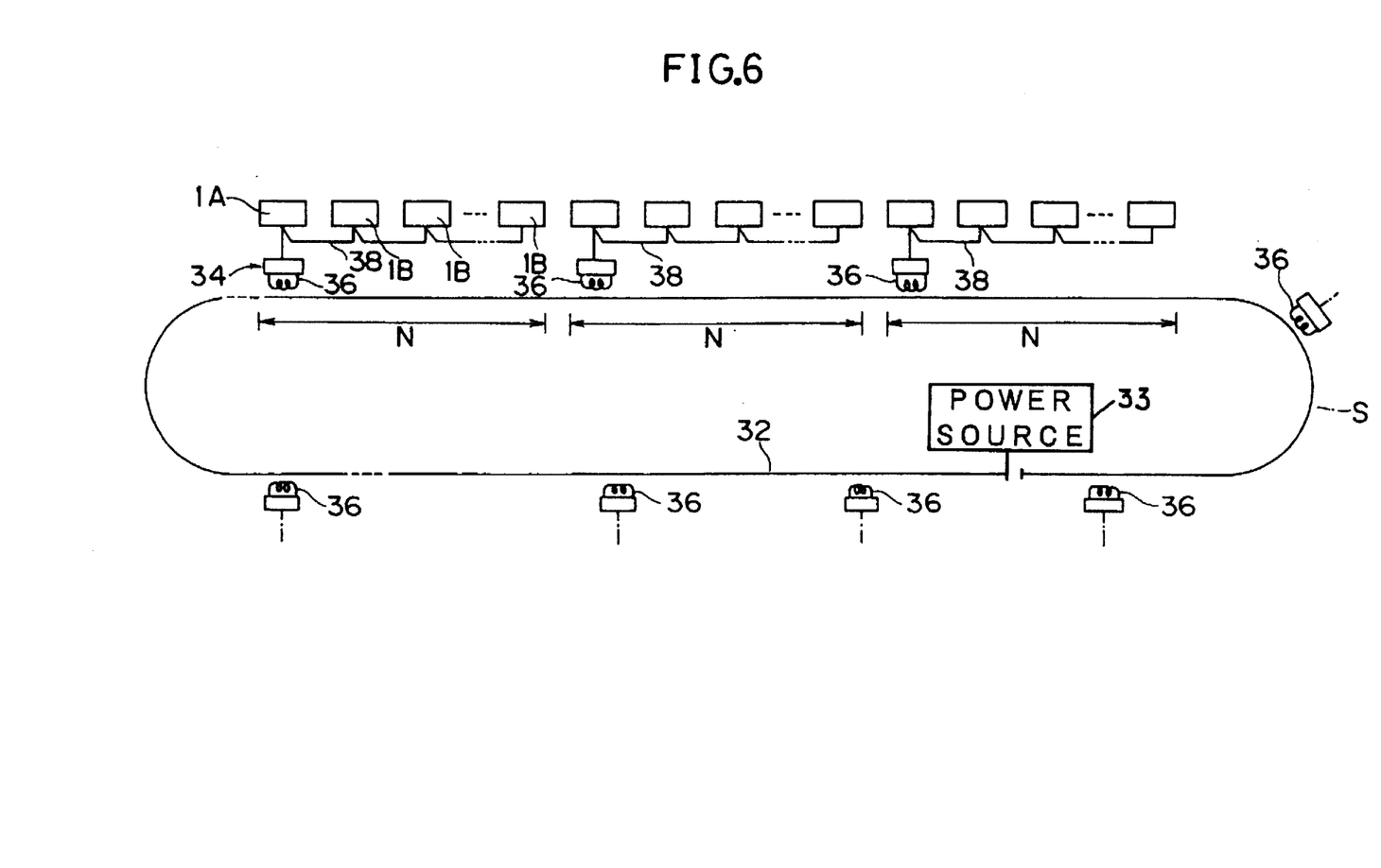
FIG. 6 is a diagram illustrating a power supply wiring of the first embodiment of the sorting equipment.

The running trucks 1 are divided into groups each consisting of N trucks as shown in FIG. 6, and only a leading truck in the direction F (hereinafter referred to a parent truck) 1A has a pickup coil 34 which is disposed as a power supply device in the body frame 22 at a location in opposite to the induction lines 32 as shown in FIG. 1. This pickup coil 34 is composed by winding the litz wire 36 by tens of turns around a side of a middle convex portion 35A of a ferrite member 35 which has an E-shaped section and is elongated in the direction F. Due to a magnetic flux produced by the induction lines 32, an electromotive force is generated in the pickup coil 34 and an AC current generated in the pickup coil is rectified and made into a constant current by a power supply circuit (not shown). This power supply circuit supplies power not only to the parent truck 1A but also sequentially to the following (N−1) running trucks (hereinafter referred to as child trucks) 1B through power supply lines 38 disposed along the coupling mechanisms 26 as shown in FIG.

Further, disposed on an outside surface of the body frame 22 of each of the running truck 1 are a controller 41 which outputs control signals composed of normal or reverse motor rotation commands to the motor 18, and an optical transceiver 42 which receives driving command signals for the conveyor 3 from a sorting controller (not shown) of the equipment and transmits, to the sorting controller, individual numbers, etc. preliminarily assigned for the running trucks 1. The controller 41 performs data communication with the sorting controller through the optical transceiver 42.

Description will be made of operations to be performed by the sorting equipment which has the configuration described above.

The magnetic flux produced by the induction lines 32 generates an electromotive force in the pickup coil 34 disposed in the parent truck 1A and this electromotive force produces an AC current, which is rectified and made into a constant voltage by the power supply circuit in the parent truck 1A, supplied from this power supply circuit to the parent truck 1A and sequentially to the following child trucks 1B through the power supply line 38, thereby being provided to the conveyor 3 and the controller 41 disposed in each running truck 1.

All the running trucks 1 which are coupled with one another by the coupling mechanisms 26 are driven by the linear motors 11 and travel along the travelling rail 8 at a constant speed. The controller 41 disposed in each of the running trucks 1 drives the conveyor 3 by outputting control signals to the motor 18 according to command signals received from the sorting controller through the optical transceiver 42, thereby loading the load 2 from the loading ports 4A onto the endless member 16 and discharging the load 2 into specified sorting chute 4B. The load 2 is carried and sorted accordingly.

Furthermore, the magnetic flux produced by the induction lines 32 produces electric charges in the horizontal axis rollers 23 and the vertical axis side rollers 24 of the running trucks 1. However, the rollers 23 and 24 which are composed of the electrically conductive wheels discharge the produced electric charges to the travelling rail 8 to prevent static electricity from being generated. Further, the magnetic flux produced by the induction lines 32 produces eddy currents in the metal plates 25 of the linear motors disposed in the running trucks 1. These eddy currents are discharged to the travelling rail 8 through the ground terminals 27, the earthling conductor 28 and electrically conductive wheels (the rollers 23 and 24) for preventing the currents from sparking.

As understood from the foregoing description, the sorting equipment according to the present invention is capable of supplying power to the running trucks 1 in a contactless condition, and preventing generation of static electricity in the horizontal axis travelling rollers 23 and the vertical axis side rollers 24 due to a magnetic flux produced by the induction lines 32, and suppressing sparking from the metal plates 25 of the linear motors. The sorting equipment can therefore prevent workers' electrical shock hazard and destruction of data in controllers 41 due to the static electricity and sparking, thereby assuring securities of the workers and preventing sorting operations from being disabled.

Though all the rollers 23 and 24 are composed of the electrically conductive wheels in the first embodiment described above, it is possible to lower a voltage of static electricity to be generated by composing only some of the rollers 23 and 24 on the electrically conductive wheels. Further, a manufacturing cost of the sorting equipment preferred as the first embodiment can be reduced by composing only some of the rollers 23 and 24 of the electrically conductive wheels.

Figure 8:
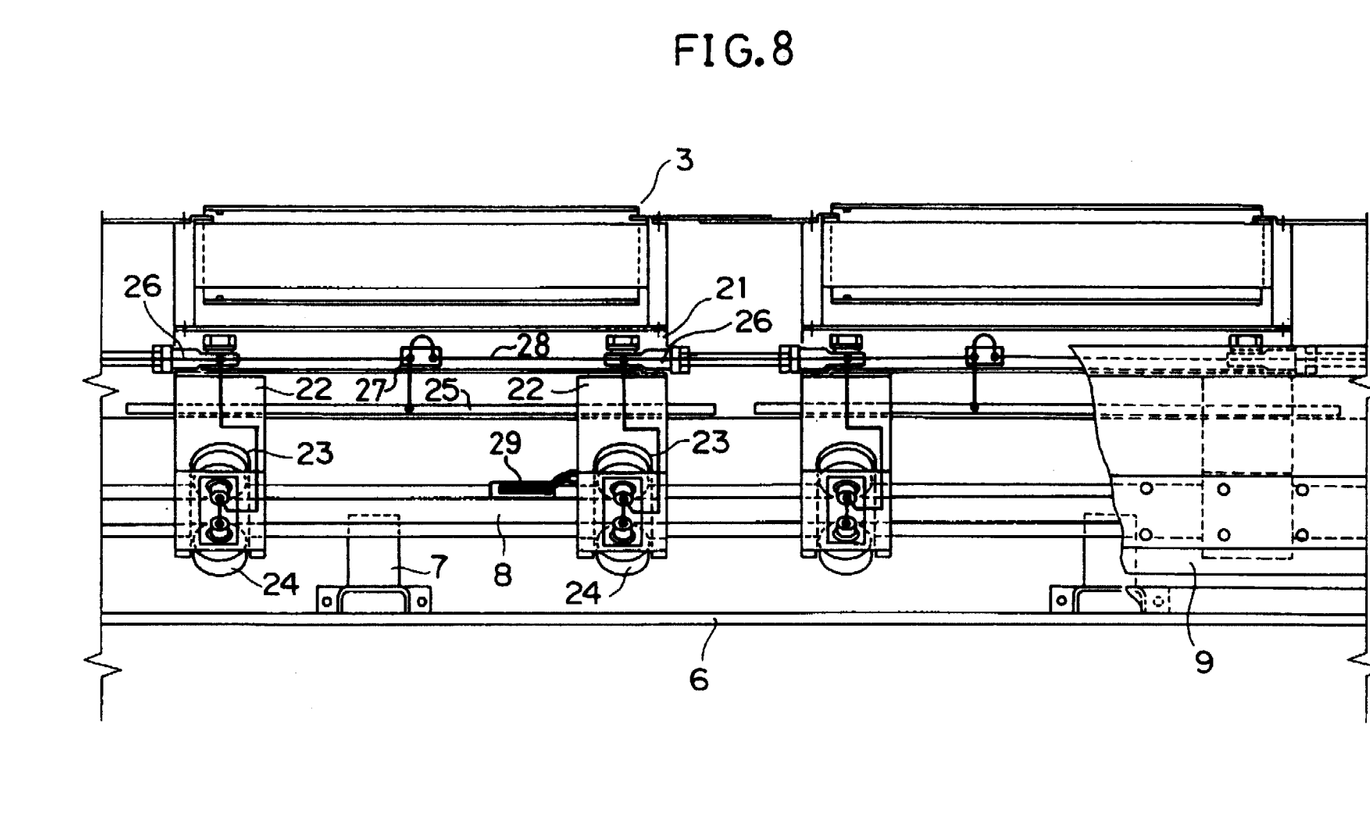
FIG. 8 is a side view illustrating the running truck to be used in the second embodiment of the sorting equipment.
Figure 9:
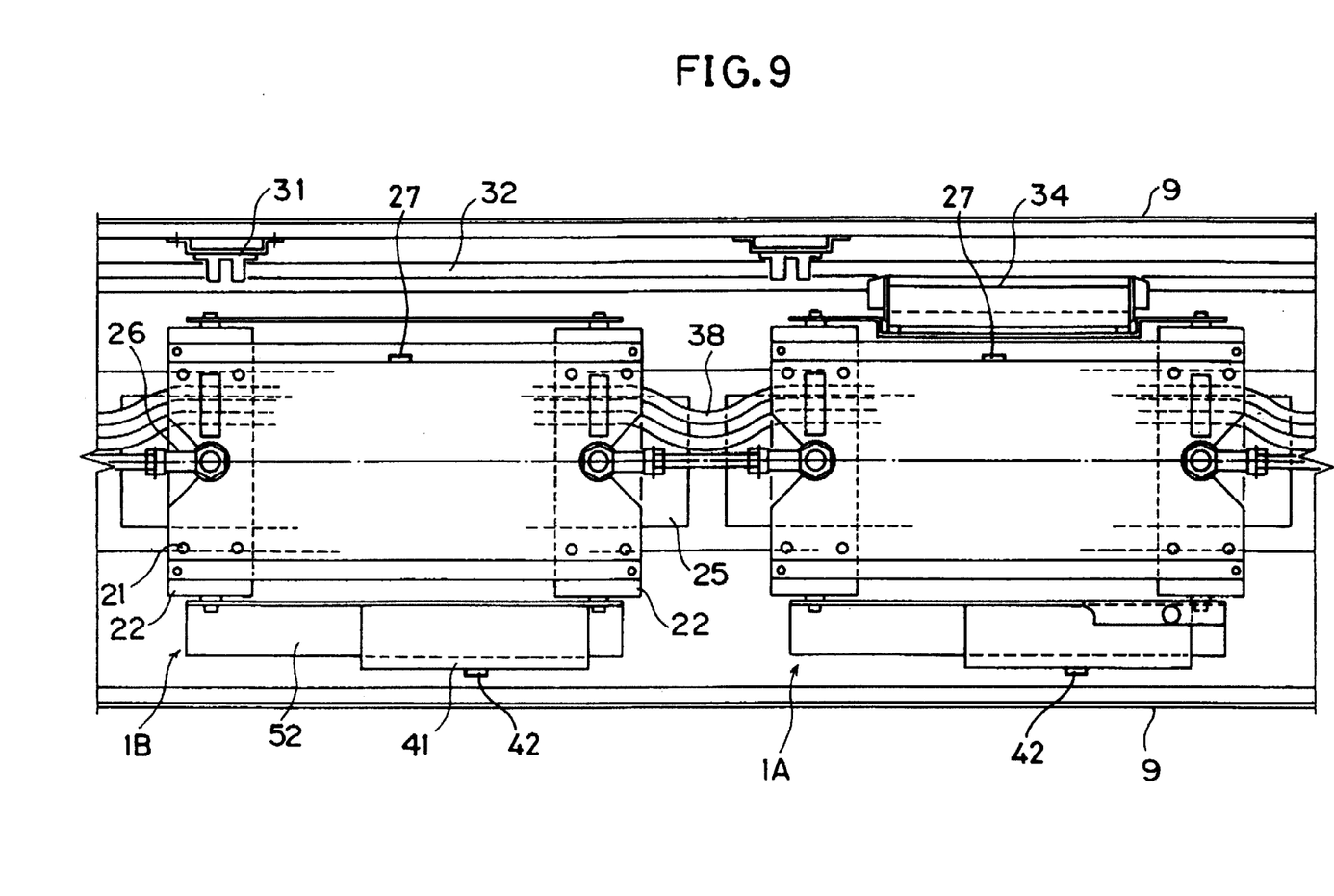
FIG. 9 is a plan view illustrating the running truck to be used in the second embodiment of the sorting equipment.

Now, running trucks 1 and travelling rails 5 which are to be used for composing a travelling route S in a second embodiment will be described with reference to FIGS. 7 through 9. Components of the second embodiment which are the same as those used in the first embodiment will be represented by the same reference numerals and will not be described in particular.

Figure 7:
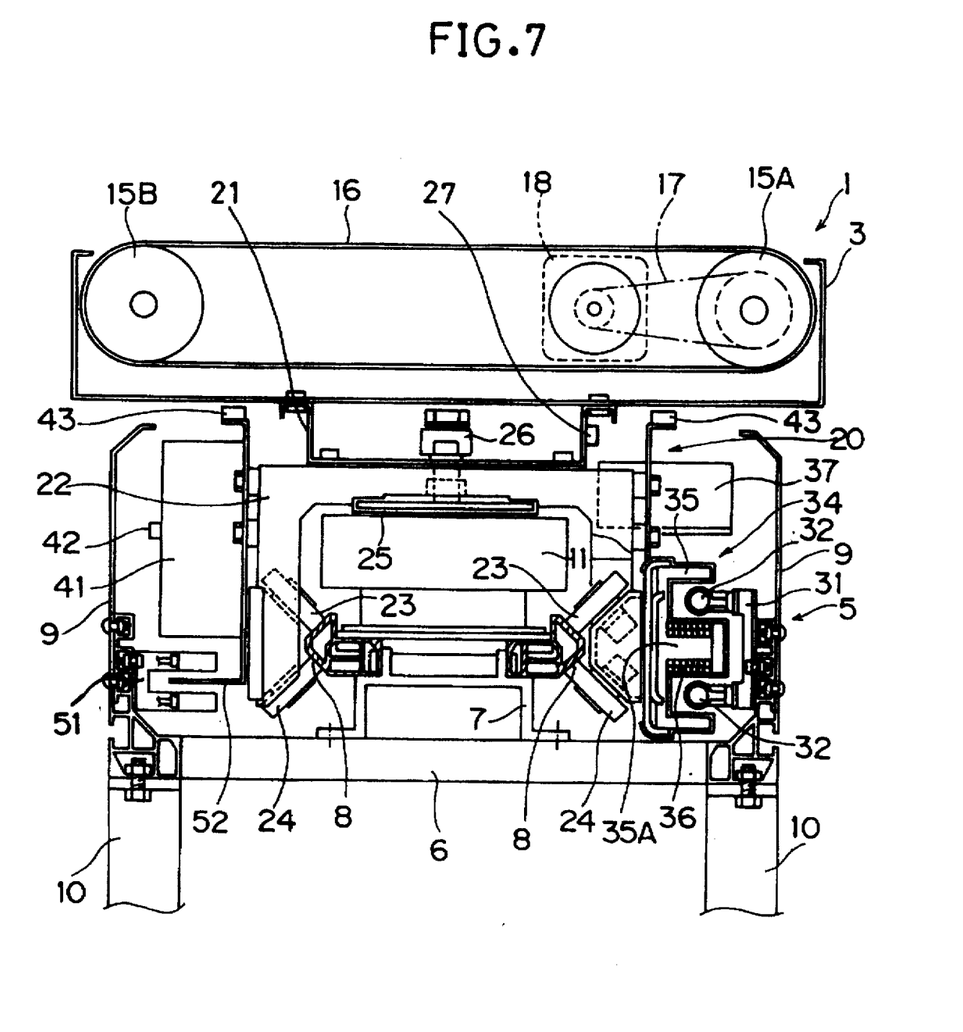
FIG. 7 is a front view illustrating a running truck to be used in a second embodiment of the sorting equipment according to the present invention.

In a rail assembly 5 adopted for the second embodiment of the present invention, supports 7 are disposed on a middle portion of a base 6 at definite intervals in a direction F, and a pair of right and left travelling rails are supported on right and left ends of the supports 7 as shown in FIG. 7. These rails 8 are formed as angles having openings formed in surfaces thereof opposed to each other. The travelling rails 8 formed as the angles constitute a definite travelling route having upper and lower inclined surfaces. The travelling rails 8 are made of an electrically conductive material such as an aluminum alloy. A linear motor (stator) 11 is disposed on the upper face of the base 6 and in a definite right and left pair of positions of the travelling rail 8 so as to face upward.

In a sorting conveyor 3, a motor 18 is disposed between a driving roller 15A and a follower roller 15B.

A movable body 20 is composed of a frame body 21 for supporting the sorting conveyor 3, a pair of body frames 22 which are fixed at locations before and after the frame body 21 in the direction F, a pair of upper and lower oblique axis travelling rollers 23 and 24 which travel along the upper and lower inclined surfaces of the definite travelling route composed of a pair of the right and left travelling rails 8, and metal plates 25 which are disposed in opposition to the linear motor 11, and between the front and rear body frames 22 so as to form secondary conductors for the linear motor 11. The oblique axis travelling rollers 23 and 24 are composed of electrically conductive wheels made of an electrically conductive material such as urethane. A ground terminal block 27 having two terminals is attached to the frame body 21 of the movable body 20.

Further, attached to the body frame 22 of the running truck 1 is a mop (cleaner) 29 for cleaning the upper inclined surface of the definite travelling route of the travelling rails 8.

Hangers 31 are attached to an inner side surface of one of covers 9 at definite intervals in the right-to-left direction, and stretched on these hangers are a pair of upper and lower induction lines 32 as shown in FIG. 7. On the body frame 22 only of a parent truck 1A, a pickup coil 34 is disposed as a power supply device at a location opposed to the induction lines 32 as shown in FIGS. 7 and 9. A magnetic flux produced by the induction lines 32 generates an electromotive force in the pickup coil 34, and an AC current produced in the pickup coil 34 is rectified and made into a constant voltage by a power supply circuit 37. This power supply circuit 37 supplies power not only to the parent truck 1A but also sequentially to (N–1) following running trucks (hereinafter referred as child trucks) through a power supply line 38 disposed along coupling mechanisms.

Further, a photoelectric switch 43 for detecting sorting chutes 4B is disposed and connected to a controller 41 as shown in FIG. 7.

Furthermore, an approach switch 51 for detecting a location of the running truck 1 is disposed at a predetermined side inside another cover 9 and a member 52 to be detected by the approach switch 51 is protruding from the body frame 22 of the running truck 1.

Description will be made of operations of the second embodiment which has the configuration described above.

The magnetic flux produced by the induction lines 32 generates an electromotive force in the pickup coil 34 of the parent truck 1A, and an AC current produced by this electromotive force is rectified and made into a constant voltage by a power supply circuit 37 disposed in the parent truck 1A, supplied from the power supply circuit 37 sequentially to the parent truck 1A and the following child trucks 1B through the power supply line 38, thereby being provided to the conveyor 3 and the controller 41 in each of the running trucks 1.

All the running trucks which are coupled with one another by the coupling mechanisms 26 are driven by the linear motors 11 and travel on the travelling rails 8 at a definite speed. Since the running trucks 1 are supported by a pair of the upper and lower axle travelling rollers 23 and 24 which sandwich the travelling rails 8, the trucks can travel not only in the horizontal direction but also in the vertical direction and in a position in which the sorting conveyors 3 are kept below the travelling rails 8.

In correspondence to command signals inputted through an optical transceiver 42 from a sorting controller and while confirming positions of sorting chutes 4B, with a photoelectric switch 43, the controller 41 of each of the running trucks outputs control signals to the motor 18, thereby driving the conveyor 3 for carrying load 2 from loading ports 4A onto an endless member 16 and discharging the load 2 into specified sorting chute 4B. The load 2 is carried and sorted accordingly. Further, the sorting controller confirms a location of the running truck 1 by using the approach switch 51.

The magnetic flux produced by the induction lines 32 produces electric charges in the oblique axis travelling rollers 23 and 24 on the running track 1. However the oblique axis rollers 23 and 24 which are composed of the electrically conductive wheels discharge the electric charges to the travelling rails 8, thereby preventing static electricity to be generated. Further, the magnetic flux produced by the induction lines 32 produces an eddy current in the metal plate 25 of the linear motors on the running truck 1. This eddy current is discharged to the travelling rails 8 through the ground terminal block 27, the earthling conductor 28 and the electrically conductive wheels (the rollers 23 and 24), thereby preventing the current from sparking.

The mop 29 cleans the upper inclined surface of the definite travelling route composed of the travelling rails 8.

As understood from the foregoing description, the sorting equipment preferred as the second embodiment of the present invention is capable of not only supplying power to the running trucks 1 in a contactless condition but also preventing generation of static electricity in the oblique axis travelling rollers 23 and 24 due to the magnetic flux produced by the induction lines 32 and suppressing sparking from the metal plates 25 of the linear motors. Accordingly, the sorting equipment is capable of preventing workers' electrical shock hazards and destruction of data in controllers 41 due to static electricity and spark discharge, thereby assuring securities for the workers and preventing the sorting operation from being disabled.

Further, the mop 29 keeps the upper surface of the definite travelling route constituted by the travelling rails 8 always in a cleaned condition or prevents dust from being accumulated on the upper surface of the definite travelling route, whereby the oblique axis travelling roller 23,which is at least one of the electrically conductive wheels of the running truck 1, is brought into contact with the travelling rail 8 without fail for securely discharging electric charges produced in the electrically conductive wheel to the travelling rails 8.

Furthermore, the configuration of the sorting equipment preferred as the second embodiment allows the movable body 20 to be disposed at a location lower than that of the movable body 20 shown in FIG. 1 owing to the fact that the travelling route S is composed of a pair of right and left travelling rails 8 formed as the angles having openings formed in the surfaces opposite to each other, the oblique axis travelling rollers 23 and 24 supporting the body frame 22 are configured to travel along the upper and lower inclined surfaces of the definite travelling route composed of the travelling rails 8, the linear motors 11 are disposed between a pair of the travelling rails 8 so as to face upward, and the metal plates 25 are disposed horizontally on the body frame 22 so as to oppose to the linear motors 11. Moreover, the sorting conveyor 3 comprising the motor 18 is lowered owing to the fact that the motor 18 is disposed between the driving roller 15A and the follower roller 15B in the conveyor 3. In addition, owing to the fact that the induction lines 32 are disposed separately from the travelling rails 8, the travelling rails 8 need not be disposed at a height which is determined by the induction lines 32, thereby making it possible to lower the movable body 20.

By thus lowering the movable body 20 and the conveyor 3, it is possible to provide a sorting equipment having a lower floor and lay the travelling route S by effectively utilizing a space even in an indoor place having a low ceiling.

What is claimed is:

1. A sorting equipment comprising a plurality of running trucks which travel along a definite travelling route in a condition where they are coupled with one another and each of which has at least one carrying means for carrying load laterally relative to a travelling direction of said running trucks, wherein an induction line to be supplied with a high-frequency current is laid along said definite travelling route, wherein a power supply coil for supplying to said carrying means an electromotive force produced due to a magnetic flux produced by said induction line is disposed in said running trucks, wherein said definite travelling route is comprised of electrically conductive members, and wherein at least one of wheels of said running truck which is to be brought into contact with said definite travelling route is made of an electrically conductive material.

2. A sorting equipment according to claim 1, wherein a linear motor is disposed along the definite travelling route, wherein a secondary conductor for said linear motor is disposed in each of the running trucks, and wherein said secondary conductor is connected to an earthling conductor of each of the running trucks and the earthling conductor is connected to the electrically conductive wheel.

3. A sorting equipment according to claim 2, wherein only a wheel of a specific running truck is configured as an electrically conductive wheel, and wherein the electrically conductive wheel is connected to an earthling conductor of said specific running truck and each earthling conductors of all the running trucks are connected to one another.

4. A sorting equipment according to claim 1, wherein said definite travelling route is comprised of a pair of right and left rails having inclined surfaces which are to be brought into contact with the wheels of the running trucks, wherein a linear motor is disposed between the pair of travelling rails, and wherein said secondary conductor for the linear motor is disposed in each of the running trucks.

5. A sorting equipment according to claim 1, wherein a cleaner is disposed in at least one of the running trucks for cleaning the surface of the definite travelling route which is to be brought into contact with the wheels of the running trucks.

* * * * *